United States Patent
Kamiyama et al.

(10) Patent No.: US 11,662,834 B2
(45) Date of Patent: *May 30, 2023

(54) ELECTRONIC ERASING DEVICE AND WRITING INFORMATION PROCESSING SYSTEM

(71) Applicant: Wacom Co., Ltd., Saitama (JP)

(72) Inventors: Ryoji Kamiyama, Saitama (JP); Toshihiko Horie, Saitama (JP); Masamitsu Ito, Saitama (JP); Shigeru Yamashita, Saitama (JP); Fujii Kosuke, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,782

(22) Filed: Jun. 7, 2022

(65) Prior Publication Data
US 2022/0300092 A1    Sep. 22, 2022

Related U.S. Application Data

(63) Continuation of application No. 17/243,399, filed on Apr. 28, 2021, now Pat. No. 11,385,725, which is a
(Continued)

(30) Foreign Application Priority Data

Nov. 9, 2018  (JP) .............................. JP2018-211309

(51) Int. Cl.
*G06F 3/03*    (2006.01)
*G06F 3/041*   (2006.01)
(Continued)

(52) U.S. Cl.
CPC .......... *G06F 3/0317* (2013.01); *G06F 3/0346* (2013.01); *G06F 3/03545* (2013.01);
(Continued)

(58) Field of Classification Search
CPC .. G06F 3/0317; G06F 3/0346; G06F 3/03545; G06F 3/0414; G06F 3/04162; G06F 3/046; G06F 3/044
See application file for complete search history.

(56) References Cited

U.S. PATENT DOCUMENTS 4,878,553 A * 11/1989 Yamanami .............. G06F 3/046
                                                      341/15
5,475,401 A * 12/1995 Verrier ................. G06F 3/0418
                                                       345/179
(Continued)

FOREIGN PATENT DOCUMENTS

JP    2-155020 A    6/1990
JP    8-69350 A     3/1996
(Continued)

OTHER PUBLICATIONS

International Search Report, dated Dec. 3, 2019, for International Application No. PCT/JP2019/041845, (2 pages).

*Primary Examiner* — Benyam Ketema
(74) *Attorney, Agent, or Firm* — Seed IP Law Group LLP

(57) ABSTRACT

An electronic erasing device includes a casing, an erasing portion slidably attached to the casing and having a bottom surface and a side surface that extends from an outer edge of the bottom surface, both the bottom surface and at least a part of the side surface protruding from an end of the casing, and a position indicator including a core body and a pressure detector that detects a pressure applied to the core body, the position indicator outputting a position indication signal indicating an erasure position indicated by the core body and information indicating the pressure. The position indicator is included in the erasing portion and fixed inside the casing such that a tip portion of the core body is positioned away
(Continued)

from an outer side of the bottom surface of the erasing portion and the applied pressure is transmitted to the core body.

16 Claims, 8 Drawing Sheets

Related U.S. Application Data continuation of application No. PCT/JP2019/041845, filed on Oct. 25, 2019.

(51) Int. Cl.
  *G06F 3/0346* (2013.01)
  *G06F 3/0354* (2013.01)
  *G06F 3/046* (2006.01)

(52) U.S. Cl.
  CPC ............ *G06F 3/046* (2013.01); *G06F 3/0414* (2013.01); *G06F 3/04162* (2019.05)

(56) References Cited

U.S. PATENT DOCUMENTS

| | | | | |
|---|---|---|---|---|
| 5,565,632 A * | 10/1996 | Ogawa | ................ | G06F 3/03545 73/862.041 |
| 5,576,502 A * | 11/1996 | Fukushima | ......... | G06F 3/03545 73/862.68 |
| 5,633,471 A * | 5/1997 | Fukushima | ......... | G06F 3/03545 73/865.4 |
| 5,661,269 A * | 8/1997 | Fukuzaki | ................ | G06F 3/046 178/20.02 |
| 5,914,708 A * | 6/1999 | LaGrange | ........... | G06F 3/03545 178/19.03 |
| D417,206 S * | 11/1999 | Hirota | .......................... | D14/411 |
| 6,064,374 A * | 5/2000 | Fukuzaki | ............ | G06F 3/03545 178/19.03 |
| 6,259,438 B1 * | 7/2001 | Fleck | .................. | G06F 3/03545 345/184 |
| 7,095,404 B2 * | 8/2006 | Vincent | ............... | G06F 3/03545 345/107 |
| D531,217 S * | 10/2006 | Hirota | .......................... | D19/184 |
| 7,685,538 B2 * | 3/2010 | Fleck | ...................... | G06F 3/038 345/157 |
| D614,623 S * | 4/2010 | Crisp | .......................... | D14/411 |
| 9,373,028 B2 | 6/2016 | Tung | | |
| 10,061,411 B2 * | 8/2018 | Peretz | ..................... | G06F 3/016 |
| 10,073,558 B2 * | 9/2018 | Kobori | .................. | G06F 3/0446 |
| 11,385,725 B2 * | 7/2022 | Kamiyama | ............. | G06F 3/046 |
| 2005/0057535 A1 * | 3/2005 | Liu | ........................ | G06T 11/203 345/179 |
| 2010/0051356 A1 * | 3/2010 | Stern | ...................... | G06F 3/0442 178/19.04 |
| 2010/0207607 A1 * | 8/2010 | Katsurahira | ............. | G06F 3/038 324/207.11 |
| 2010/0321288 A1 * | 12/2010 | Katsurahira | ......... | G06F 3/04166 345/156 |
| 2012/0086664 A1 * | 4/2012 | Leto | ........................ | B43K 8/003 345/173 |
| 2014/0002422 A1 * | 1/2014 | Stern | ...................... | G06F 3/0383 345/179 |
| 2014/0043301 A1 | 2/2014 | Katsurahira | | |
| 2014/0298244 A1 * | 10/2014 | Kim | .................... | G06F 3/04855 715/780 |
| 2015/0205387 A1 * | 7/2015 | Osterhout | ................ | G09G 5/12 345/179 |
| 2015/0212600 A1 * | 7/2015 | Zerayohannes | ..... | G06F 3/03545 345/179 |
| 2016/0034752 A1 * | 2/2016 | Tung | ................... | G06F 3/04883 382/189 |
| 2017/0357340 A1 | 12/2017 | Kamiyama et al. | | |
| 2018/0052531 A1 | 2/2018 | Peretz et al. | | |
| 2018/0052534 A1 * | 2/2018 | Ron | ........................ | G06T 11/60 |
| 2018/0181231 A1 * | 6/2018 | Ishikura | ................ | G06F 3/0488 |
| 2019/0179434 A1 * | 6/2019 | Tanaka | .................... | G06F 3/046 |
| 2019/0227644 A1 * | 7/2019 | Nakayama | .......... | G06F 3/03545 |
| 2019/0384425 A1 * | 12/2019 | Oda | ................ | G06F 3/03546 |
| 2022/0300092 A1 * | 9/2022 | Kamiyama | ......... | G06F 3/04162 |

FOREIGN PATENT DOCUMENTS

| | | |
|---|---|---|
| JP | 2010-191588 A | 9/2010 |
| JP | 2014-035631 A | 2/2014 |
| JP | 2016-095833 A | 5/2016 |
| WO | 2016/143498 A1 | 9/2016 |
| WO | 2017-004381 A | 1/2017 |
| WO | 2018-037014 A | 3/2018 |

\* cited by examiner

ELECTRONIC ERASING DEVICE AND WRITING INFORMATION PROCESSING SYSTEM

BACKGROUND

Technical Field

The present disclosure relates to an electronic erasing device that can erase information written on, for example, a tablet personal computer (PC) in a similar manner to an eraser which is stationery, and a system including the electronic erasing device.

Background Art

Electronic devices such as tablet PCs and high-function mobile terminals, which include a thin display device such as a liquid-crystal display (LCD) and a position detection sensor, are more and more widely used. By using a generally-called electronic pen, the user can input characters, figures, and symbols into such an electronic device as handwriting information. When handwriting information is input, a handwriting image corresponding to the handwriting information is displayed at a position on a display screen of a display device corresponding to the position indicated by the electronic pen. Thus, the user can input handwriting information into the electronic device in a similar manner to the case where the user records on paper using a pencil.

To correct the handwriting information input into the electronic device using the electronic pen, the user can erase the handwriting information using an eraser function, which transmits a signal different from a signal transmitted when the handwriting information is input. As disclosed in Japanese Patent Laid-Open No. H08-069350 (Patent Document 1), the eraser function is provided at a rear end portion of an electronic pen. Specifically, as with a pencil with an eraser disposed at a rear end portion thereof, the electronic pen with the eraser function has one end portion providing the writing function and another end portion providing the eraser function. To erase desired handwriting information, the user brings the rear end portion of the electronic pen with the eraser function closer to the handwriting information to be erased while checking the handwriting image displayed on the display screen of the display device.

However, even when the pencil with the eraser disposed at the rear end portion is in use, the eraser disposed at the rear end portion of the pencil is rarely used in erasing handwriting on the paper. Instead, a stand-alone eraser is used more often. Presumably, one of the reasons is that the stand-alone eraser is more familiar to the user and the user can erase the handwriting more cleanly and desirably than the eraser disposed at the rear end portion of the pencil. For this reason, as disclosed in Japanese Patent Laid-Open No. H02-155020 (Patent Document 2), there is provided a stand-alone electronic erasing device to erase handwriting information input into an electronic device using an electronic pen. This stand-alone electronic erasing device has only a handwriting information erasing function.

However, a stand-alone electronic erasing device having only the handwriting information erasing function, like the one disclosed in Patent Document 2, regards the entire end surface on the signal emitting side as the indicated position, as disclosed in Patent Document 2. Therefore, it is difficult to erase handwriting information in a very small range with a conventional stand-alone electronic erasing device. In view of the foregoing, there is a need of a stand-alone electronic erasing device with which the user can erase a small portion as easily as when erasing a small portion using a corner of an eraser which is stationery (hereinafter referred to as a "stationery eraser").

In recent years, electronic devices such as tablet PCs are more and more used by students at schools such as elementary and junior high schools. What is desired is that handwriting information can not only be input into an electronic device using an electronic pen as if handwriting were recorded on paper using a pencil, but also be erased in accordance with the intent of the user, as if handwriting written on the paper were erased using an eraser.

BRIEF SUMMARY

In view of the foregoing, it is desirable to enable handwriting information or the like input into an electronic device such as a tablet PC to be erased in accordance with the intent of the user, in a similar manner to a stationery eraser.

There is provided an electronic erasing device including: a casing; an erasing portion slidably attached to the casing and having a bottom surface and a side surface that extends from an outer edge of the bottom surface, both the bottom surface and at least a part of the side surface protruding from an end of the casing; and a position indicator including a core body and a pressure detector which, in operation, detects a pressure applied to the core body, the position indicator being configured to output a position indication signal indicating an erasure position indicated by the core body and information indicating the pressure detected by the pressure detector, in which the position indicator is included in the erasing portion and fixed inside the casing such that a tip portion of the core body is positioned away from an outer side of the bottom surface of the erasing portion and such that the pressure applied to the erasing portion is transmitted to the core body.

According to this electronic erasing device, the erasing portion is attached to the casing. Specifically, the erasing portion is slidably attached to the casing, with both the bottom surface and at least a part of the side surface of the erasing portion protruding from the end of the casing. In the present specification, "sliding" refers to a motion of moving in, moving out, or moving in a sliding manner, like a piston, for example. The position indicator is fixed inside the casing such that the tip portion of the core body of the position indicator is positioned at a predetermined distance away from the outer surface of the bottom surface of the erasing portion and such that the pressure applied to the erasing portion is transmitted to the core body. When the erasing portion is brought into contact with an operation surface of an electronic device with the casing tilted to the operation surface, a corner portion formed by the bottom surface and the side surface of the erasing portion contacts the operation surface and the position indicator outputs the position indication signal and the information indicating the pressure applied to the erasing portion.

With this configuration, control can be performed such that an erasure target image (handwriting information or the like being displayed) within the range (erasable area) corresponding to the pressure applied to the erasing portion can be erased based on the position on a display screen of a display device corresponding to the indicated position.

DETAILED DESCRIPTION OF THE PREFERRED EMBODIMENTS

Figure 1A:
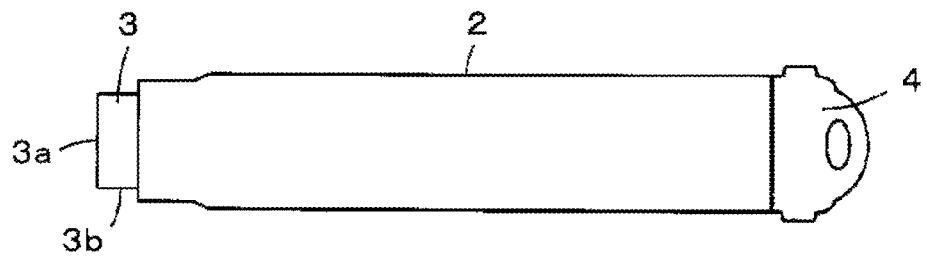
FIGS. 1A to 1E are diagrams for describing an electronic erasing device according to a first embodiment.

Some embodiments of an electronic erasing device and a writing information processing system including the electronic erasing device and an electronic device according to the present disclosure will be described below with reference to the drawings. The electronic erasing device according to an embodiment of the present disclosure is used for an electronic device, such as a tablet personal computer (PC) and a smartphone, which includes a thin display device such as a liquid-crystal display (LCD) and a position detection device.

Specifically, the electronic erasing device according to an embodiment of the present disclosure is used to erase, for example, handwriting information, such as characters, symbols, or figures, which has been input into the electronic device using an electronic pen (position indicator for recording). The electronic erasing device can also be referred to as an electronic eraser. The writing information processing system according to an embodiment of the present disclosure includes the electronic erasing device and the electronic device such as a tablet PC or a smartphone and is designed such that information input into the electronic device using the electronic pen and displayed on the electronic device can be easily erased using the electronic erasing device.

Overview of Electromagnetic Induction Type and Active Electrostatic Coupling Type A schematic configuration of the position detection device and the position indicator (electronic pen) will be described. The position detection device and the position indicator (electronic pen) can be of an electromagnetic induction type (electro magnetic resonance (EMR) technology) or an active electrostatic coupling type (active electrostatic (AES) technology), for example.

The position detection device of the electromagnetic induction type includes a sensor in which a plurality of loop coils are disposed in each of the X-axis and Y-axis directions. In a transmission period, power is sequentially supplied to the plurality of loop coils in the sensor to generate a magnetic field. In a reception period, the power supply is stopped and a magnetic field from the outside is received. The transmission period and the reception period are alternately provided. The corresponding position indicator of the electromagnetic induction type includes a resonant circuit including a coil and a capacitor. Current flowing through the coil in response to the magnetic field from the sensor generates a signal (magnetic field). The position indicator includes writing pressure information in this signal and transmits the signal to the sensor of the position detection device. In the reception period, the position detection device receives the signal and detects the indicated position and writing pressure of the electronic pen.

The electronic pen of the active electrostatic coupling type includes writing pressure information in a signal received from an oscillation circuit, which is mounted in the electronic pen, and transmits the signal. The position detection device of the active electrostatic coupling type receives this signal and detects the indicated position and the writing pressure. The electronic erasing device according to each of the embodiments described below can be configured so as to be usable with the position detection device of the electromagnetic induction type or the position detection device of the active electrostatic coupling type. For ease of description in the embodiments below, the electronic erasing device is an electronic erasing device configured so as to be usable with the position detection device of the electromagnetic induction type (EMR technology).

First Embodiment

FIGS. 1A to 1E are diagrams for describing an electronic erasing device 1 according to a first embodiment. FIG. 1A illustrates the external appearance of the electronic erasing device 1. As illustrated in FIG. 1A, the electronic erasing device 1 includes a cylindrical casing 2, an erasing portion 3, and a holding portion 4. The erasing portion 3 is located at one end portion (front end) of the casing 2 in a longitudinal direction of the casing 2. The holding portion 4 with a position indicator 5 described later attached to and held by the holding portion 4 is inserted from another end portion (rear end) of the casing 2 in the longitudinal direction and fixed to the casing 2. The erasing portion 3 has a circular bottom surface 3a and a side surface 3b. The side surface 3b extends cylindrically from the outer circumference (outer edge) of the bottom surface 3a.

Figure 1B:
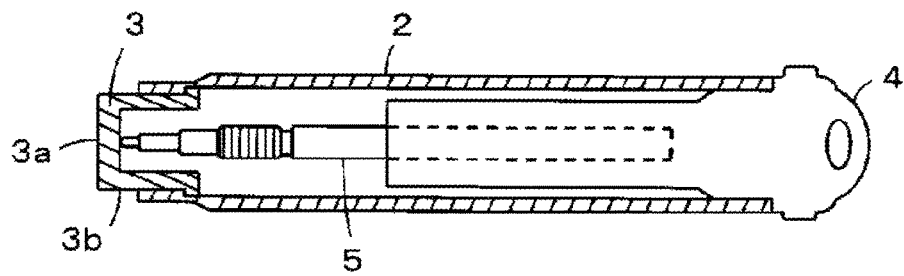

FIG. 1B illustrates the electronic erasing device 1 with the casing 2 and the erasing portion 3 cut in half in the longitudinal direction and a portion of the casing 2 and the erasing portion 3 on the near side in the direction perpendicular to the drawing sheet of FIG. 1B removed. The erasing portion 3 has a cup shape with a recess. An end portion of the erasing portion 3 on the opening side of the recess extends outward. When the erasing portion 3 and the holding portion 4 to which the position indicator 5 is attached are mounted in the casing 2, a tip portion of a core body of the position indicator 5 slightly contacts an inner surface of the bottom surface 3a of the erasing portion 3.

In this state, the core body is not pushed further than necessary in the axial direction of the position indicator 5. As illustrated in FIG. 1B, each of the bottom surface 3a and the side surface 3b of the erasing portion 3 has a predetermined thickness. Therefore, when the electronic erasing device 1 is not in use, the tip portion of the core body of the position indicator 5 is held at a predetermined distance away from an outer surface of the bottom surface 3a and an outer surface of the side surface 3b.

The erasing portion 3 is slidable (movable) to the inner side of the casing 2 when the erasing portion 3 is pressed from the outside. Accordingly, the pressure applied to the erasing portion 3 is transmitted to the core body of the position indicator 5 and is detected by a pressure detector included in the position indicator 5. When the pressure applied to the erasing portion 3 is released, the position indicator 5 pushes back the erasing portion 3, returning the erasing portion 3 to its original position.

Figure 1C:
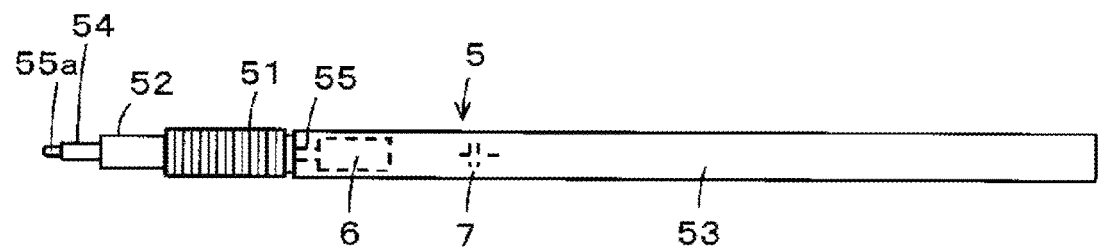

FIG. 1C is a diagram for describing the configuration of the position indicator 5. As illustrated in FIG. 1C, a magnetic core, in this example, a ferrite core 52, is coupled to a tubular portion 53. A coil 51 is wound around the ferrite core 52. A metal core rod 54, which is a hollow pipe, is fixedly fitted into the ferrite core 52 at a position including the centerline of the ferrite core 52 in the axial direction. Therefore, the pipe-shaped metal core rod 54 is inserted and fixed into (adhered to) the position including the centerline of the ferrite core 52 so as to fit snugly into a through-hole of the ferrite core 52.

In the position indicator 5, a core body 55 is inserted into a hollow portion (through-hole) of the pipe-shaped metal core rod 54. A tip portion 55a of the core body 55 protrudes from the pipe-shaped metal core rod 54, constituting a pen nib. Another end of the core body 55 presses a pressure detector 6 disposed inside the tubular portion 53. Inside the tubular portion 53, circuit components such as a capacitor 7, which constitutes a resonant circuit together with the coil 51 and the pressure detector 6, are also mounted.

The casing 2 of the electronic erasing device 1 is formed of a hard resin such as a polyethylene terephthalate (PET) resin, for example. Each of the erasing portion 3 and the holding portion 4 is formed of a relatively hard and elastic resin material such as a polyoxymethylene (POM) resin. This configuration allows the holding portion 4 to be firmly fitted into the casing 2 while preventing the erasing portion 3 from scratching an operation surface, which is formed of a protective glass or the like formed on a display screen of a display device of an electronic device.

Assume that the user has drawn and input handwriting information into the electronic device using an electronic pen and the handwriting information is displayed as input image information on the display screen of the display device. If the user needs to erase a portion of the input image information, the user can tilt the electronic erasing device 1 and bring a corner portion formed by the bottom surface 3a and the side surface 3b, that is, the outer edge of the bottom surface 3a into contact with a position on the operation surface corresponding to the portion to be erased (erasure portion) of the input image information while pressing the corner portion against the position on the operation surface. In this state, the user can move the electronic erasing device 1 so as to rub a narrow range including the erasure portion of the input image information.

Figure 1D:
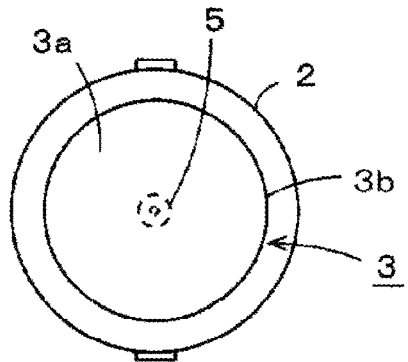

FIG. 1D illustrates a bottom view of the electronic erasing device 1. As illustrated in FIG. 1D, the erasing portion 3 is located on the inner side of the casing 2 of the electronic erasing device 1, and the core body 55 of the position indicator 5 is located in the center of the erasing portion 3. Therefore, when the electronic erasing device 1 is used with the electronic erasing device 1 tilted, the corner portion formed by the bottom surface 3a and the side surface 3b, that is, the outer edge of the bottom surface 3a, becomes a contact portion that contacts the operation surface. Accordingly, the input erasure target image can be erased using the electronic erasing device 1 in a similar manner to the case where handwriting is erased using a corner portion of a cylindrical eraser.

The position detection device can determine to which side and how much the electronic erasing device 1 is tilted according to the reception mode of a signal (magnetic field) (the magnitude of the waveform of the received signal) emitted from the position indicator 5, which is mounted in the electronic erasing device 1. Tilting the electronic erasing device 1 deviates the position to be detected. Therefore, correction is performed such that the position (coordinates) of the tip portion 55a of the position indicator 5 in the position detection device is set to a position of intersection between the operation surface and a perpendicular line extending from the tip portion 55a to the operation surface.

In order to erase a target object using the corner portion of the electronic erasing device 1, the electronic erasing device 1 is tilted. When the electronic erasing device 1 is tilted, the corner portion needs to match the position of intersection of the tip portion 55a of the position indicator 5, which is mounted in the electronic erasing device 1. Pressing this corner portion against the displayed target object applies a pressure, and the position detection device detects a signal for erasure. In this state, moving the electronic erasing device 1 so as to rub the operation surface can erase the target object. The angle at which the electronic erasing device 1 is tilted depends on the position of the position indicator 5 in the electronic erasing device 1.

Figure 1E:
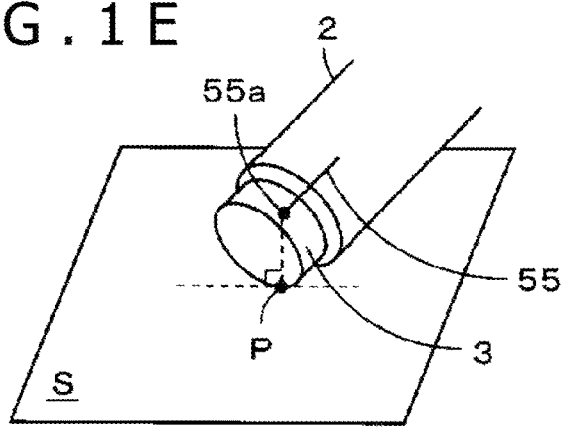

FIG. 1E is a diagram for describing a relationship between the position indicator 5 of the electronic erasing device 1 and an operation surface S of the electronic device. Consider a case where the erasing portion 3 is brought into contact with the operation surface S with the electronic erasing device 1 tilted at, for example, 45 degrees to the operation surface S. In this case, as illustrated in FIG. 1E, the position of intersection between the operation surface S and the perpendicular line extending from the tip portion 55a of the core body 55 of the position indicator 5, which is mounted in the electronic erasing device 1, to the operation surface S matches a position of contact (point of contact) P between the operation surface S and the erasing portion 3. Erasing is performed by rubbing this portion with the corner portion.

The angle at which the electronic erasing device 1 is tilted does not have to be exactly 45 degrees. For example, even with 35 to 55 degrees, changing the position of the position indicator 5 in the electronic erasing device 1 can make the corner portion match the erasure range. However, it goes without saying that the angle of the corner portion that is easy to use is 45 degrees.

As described above, the position indicator 5 can also detect a pressure (pressing force) applied to the erasing portion 3. Then, the position indicator 5 can include the result of this detection in a position indication signal, which is to be transmitted as a magnetic field, and transmit the position indication signal. Therefore, the electronic device can detect not only the indicated position but also the pressure applied to the erasing portion 3. Accordingly, in proportion to the pressure applied to the erasing portion 3 of the electronic erasing device 1, the electronic device can widen or narrow the erasure range based on the indicated position. Thus, the erasure range can be controlled according to the pressure applied, in a similar manner to an eraser which is stationery (hereinafter referred to as a "stationery eraser").

There may be cases where the electronic erasing device 1 is dropped with the erasing portion 3 facing downward or the erasing portion 3 is hit hard against a wall or the like. In this case, unlike the case where the electronic erasing device 1 is used for erasing, the erasing portion 3 receives a sudden and excessive pressure, instead of a relatively slow and gradual pressure. This sudden and excessive pressure is also applied to the position indicator 5. However, since a generally-called shock absorber mechanism is disposed inside the holding portion 4 according to the first embodiment, the shock absorber mechanism can absorb a sudden and excessive pressure applied to the erasing portion 3 and the position indicator 5, preventing damage to the erasing portion 3 and the position indicator 5.

Second Embodiment

Figure 2A:
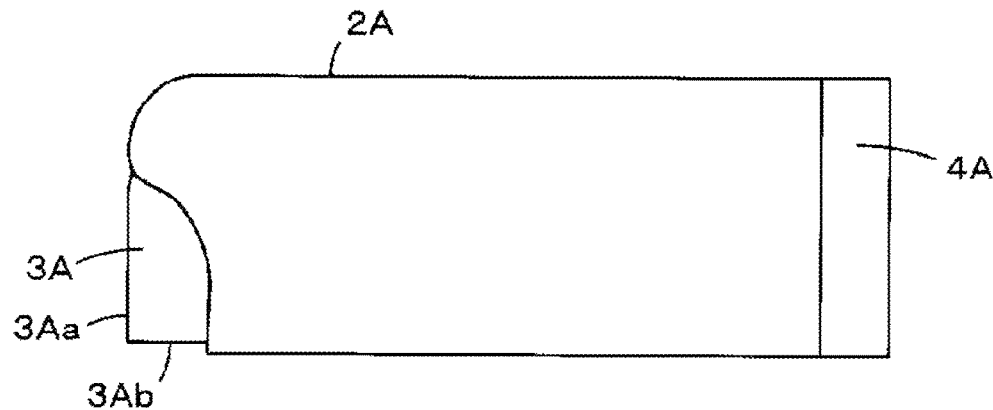
FIGS. 2A to 2D are diagrams for describing an electronic erasing device according to a second embodiment.

FIGS. 2A to 2D are diagrams for describing an electronic erasing device 1A according to a second embodiment. FIG. 2A illustrates the external appearance of the electronic erasing device 1A. As illustrated in FIG. 2A, the electronic erasing device 1A is of a generally-called rectangular type and includes a casing 2A, an erasing portion 3A, and a holding portion 4A. The casing 2A has the external appearance of a substantially rectangular parallelepiped and is hollow inside. The erasing portion 3A is located at one end portion (front end) of the casing 2A in the longitudinal direction. The holding portion 4A with the position indicator 5 described later attached to and held by the holding portion 4A is inserted from another end portion (rear end) of the casing 2A in the longitudinal direction and fixed to the casing 2A.

Figure 2B:
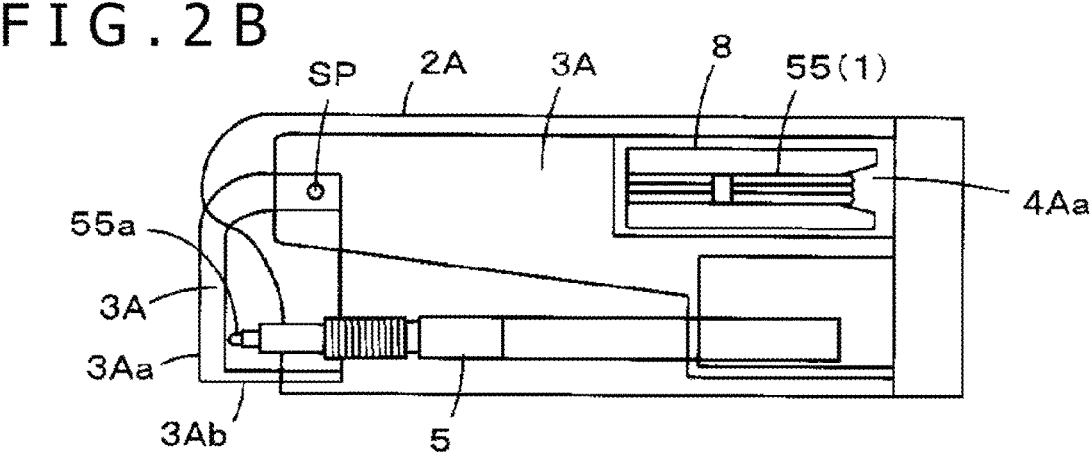

FIG. 2B illustrates the electronic erasing device 1A, assuming that the casing 2A, the erasing portion 3A, and the holding portion 4A are transparent so that the inside of the electronic erasing device 1A can be seen. As illustrated in FIG. 2B, the erasing portion 3A has a cup shape with a recess, and one end portion of the erasing portion 3A on the opening side of the recess is turnably attached to a support point SP, which is located in the vicinity of a tip portion of the holding portion 4A. This configuration allows the erasing portion 3A to slide (move) such that another end portion of the erasing portion 3A is pushed into the casing 2A or returns to its original position about the support point SP.

As illustrated in FIG. 2B, the position indicator 5 is attached to and held by the holding portion 4A. The position indicator 5 is similar to the one described with reference to FIG. 1C. When the erasing portion 3A and the holding portion 4A to which the position indicator 5 is attached are mounted in the casing 2A, the tip portion 55a of the core body 55 of the position indicator 5 slightly contacts an inner surface of a bottom surface 3Aa of the erasing portion 3A. In this state, the core body 55 is not pushed further than necessary in the axial direction of the position indicator 5. As illustrated in FIG. 2B, each of the bottom surface 3Aa and a side surface 3Ab of the erasing portion 3A has a predetermined thickness. Therefore, when the electronic erasing device 1A is not in use, the tip portion 55a of the core body 55 of the position indicator 5 is held at a predetermined distance away from an outer surface of the bottom surface 3Aa and an outer surface of the side surface 3Ab.

Assume that the user has drawn and input information into the electronic device using the electronic pen and the information is displayed as input image information on the display screen of the display device. If the user needs to erase a portion of the input image information, the user can tilt the electronic erasing device 1A and bring an outer edge 3X, which is a semicircular portion of the erasing portion 3A illustrated in FIG. 2C, into contact with a position on the operation surface corresponding to an erasure portion of the input image information while pressing the outer edge 3X against the position on the operation surface. In this state, the user can move the electronic erasing device 1A so as to rub a narrow range including the erasure portion of the input image information. This outer edge 3X is a portion formed by a corner portion, which is formed by the bottom surface 3Aa and the side surface 3Ab, and is a corner portion of the erasing portion 3A.

Figure 2C:
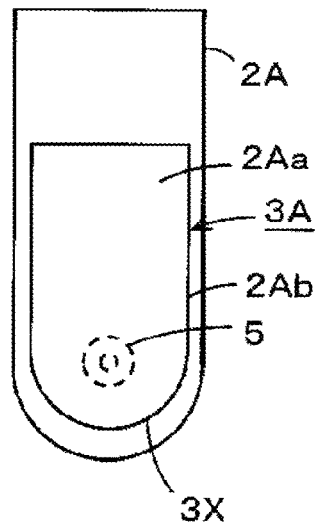

In this case, as with the electronic erasing device 1 according to the first embodiment described above, the outer edge 3X of the bottom surface 3Aa of the erasing portion 3A that is in contact with the operation surface functions to indicate the erasure position. As illustrated in FIG. 2C, the erasing portion 3A is located on the inner side of the casing 2A of the electronic erasing device 1A, and the core body 55 of the position indicator 5 is located in the center of the diameter of the semicircle of the semicircular portion. Therefore, when the corner portion formed by the bottom surface 3Aa and the side surface 3Ab, that is, the outer edge 3X of the semicircular portion of the bottom surface 3Aa is brought into contact with the operation surface with the electronic erasing device 1A tilted, this contact portion serves as a position indicating the erasure position. Accordingly, the input image information can be erased using the electronic erasing device 1A according to the second embodiment in a similar manner to the case where handwriting is erased using a corner portion of a cylindrical eraser.

Figure 2D:
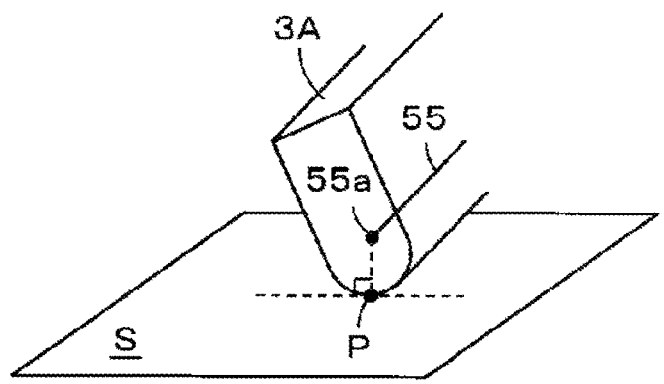

FIG. 2D is a diagram for describing a relationship between the position indicator 5 of the electronic erasing device 1A and the operation surface S. Consider a case where the outer edge 3X of the erasing portion 3A is brought into contact with the operation surface S with the electronic erasing device 1A tilted at, for example, 45 degrees to the operation surface S. As illustrated in FIG. 2D, the position indicator 5 is incorporated into the electronic erasing device 1A such that, in the above case, the position of intersection between the operation surface S and the perpendicular line extending from the tip portion (pen nib) 55a of the core body 55 of the position indicator 5, which is incorporated into the electronic erasing device 1A, to the operation surface S matches a position of contact P between the operation surface S and the outer edge 3X of the erasing portion 3A.

As with the electronic erasing device 1 according to the first embodiment described with reference to FIG. 1E, the electronic erasing device 1A according to the second embodiment can identify the contact of the outer edge 3X of the erasing portion 3A with the operation surface S and the position of contact thereof. Therefore, the position indicator 5 is incorporated into the electronic erasing device 1A such that the corner portion of the erasing portion 3A comes to this position. Thus, rubbing the corner portion can erase the target object.

As with the electronic erasing device 1 according to the first embodiment, the erasure range can be widened or narrowed based on the indicated position in proportion to the pressure applied to the erasing portion 3A and detected by the pressure detector 6 of the position indicator 5, which is mounted in the electronic erasing device 1A. Thus, the erasure range can be controlled according to the pressure applied to the erasing portion 3A of the electronic erasing device 1A in a similar manner to a stationery eraser.

The electronic erasing device 1A has a substantially rectangular parallelepiped shape and is larger in size than the electronic erasing device 1 of the chalk type according to the first embodiment. Thus, as illustrated in FIG. 2B, the holding portion 4A housed in the casing 2A includes a storage portion 4Aa in which refill cores 55(1), 55(2), . . . and a core remover 8 are stored. The refill cores used in the electronic pen for writing are short and thin. Thus, if a refill core is kept for use alone, there is a high possibility that it will be lost or damaged.

However, storing the refill cores 55(1), 55(2), . . . and the core remover 8 in the storage portion 4Aa included in the holding portion 4A of the electronic erasing device 1A can carry the refill cores without loss or damage. As illustrated in the top view of FIG. 2B, for example, sliding an accompanying lid of the storage portion 4Aa of the holding portion 4A exposes the opening of the storage portion 4Aa. From this opening, the refill cores 55(1), 55(2), . . . and the core remover 8 can be stored or taken out. The core remover 8 is used to easily remove the core body 55 from the electronic pen by pinching and pulling the tip portion 55a of the core body 55 attached to the electronic pen.

As with the electronic erasing device 1 according to the first embodiment, a generally-called shock absorber mechanism is disposed in a portion of the holding portion 4A, which holds the position indicator 5. This shock absorber mechanism can absorb a sudden and excessive pressure applied to the erasing portion 3A and the position indicator 5, preventing damage to the erasing portion 3A and the position indicator 5. In the electronic erasing device 1A according to the second embodiment as well, the casing 2A is formed of a hard resin such as a PET resin, for example. Each of the erasing portion 3A and the holding portion 4A is formed of a relatively hard and elastic resin material such as a POM resin.

Modification of Second Embodiment

Figure 3A:
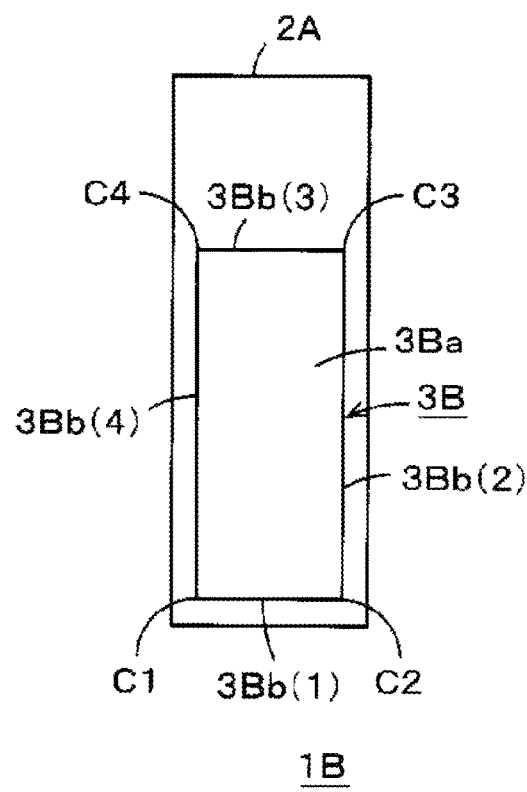
FIGS. 3A and 3B are diagrams for describing an electronic erasing device according to another example of the second embodiment.
Figure 3B:
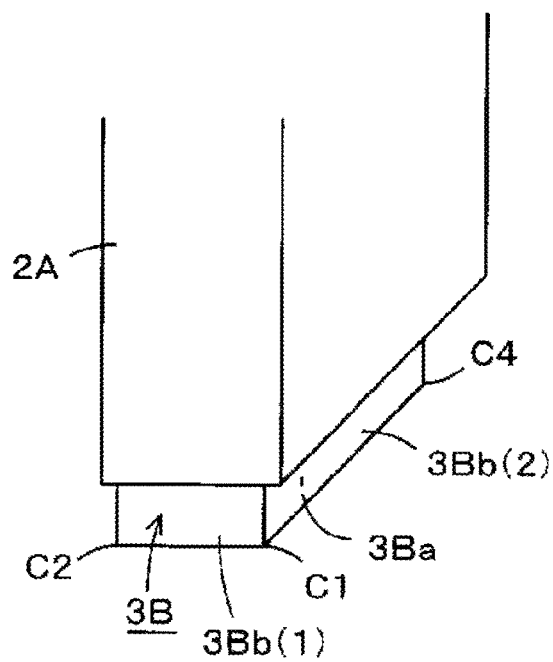

FIGS. 3A and 3B are diagrams for describing an electronic erasing device 1B according to another example of the second embodiment. As described with reference to FIG. 2C, the erasing portion 3A of the electronic erasing device 1A according to the second embodiment has the bottom surface 3Aa and the side surface 3Ab. The bottom surface 3Aa has a substantially rectangular shape with its one short side having a semicircular shape, while the side surface 3Ab extends cylindrically from the outer edge of the bottom surface 3Aa.

By contrast, as illustrated in FIG. 3A, the electronic erasing device 1B according to the present modification includes an erasing portion 3B, which has a bottom surface 3Ba and side surfaces 3Bb(1), 3Bb(2), 3Bb(3), and 3Bb(4). The bottom surface 3Ba has a rectangular shape. The side surfaces 3Bb(1), 3Bb(2), 3Bb(3), and 3Bb(4) extend from the respective four sides of the bottom surface 3Ba. Therefore, as illustrated in FIG. 3B, the electronic erasing device 1B including the erasing portion 3B has a substantially rectangular parallelepiped shape (the shape of a matchbox), as with a general stationery eraser. Four corner portions of the bottom surface 3Ba of the erasing portion 3B will be referred to as C1, C2, C3, and C4.

Figure 4:
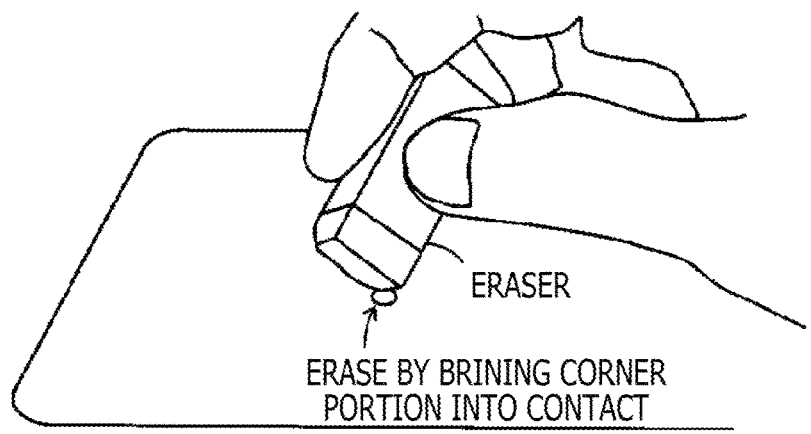
FIG. 4 is a diagram illustrating a mode of use of an eraser which is stationery.

FIG. 4 is a diagram illustrating a mode of use of a stationery eraser having a substantially rectangular parallelepiped shape. Since the electronic erasing device 1B according to the present modification has a substantially rectangular parallelepiped shape, the electronic erasing device 1B according to the present modification can be used in the same manner as the general stationery eraser having a substantially rectangular parallelepiped shape illustrated in FIG. 4. In other words, erasing can be performed using the corner portion C1 or C2 of the erasing portion 3B, or a linear corner portion connecting the corner portions C1 and C2 of the erasing portion 3B.

Figure 5A:
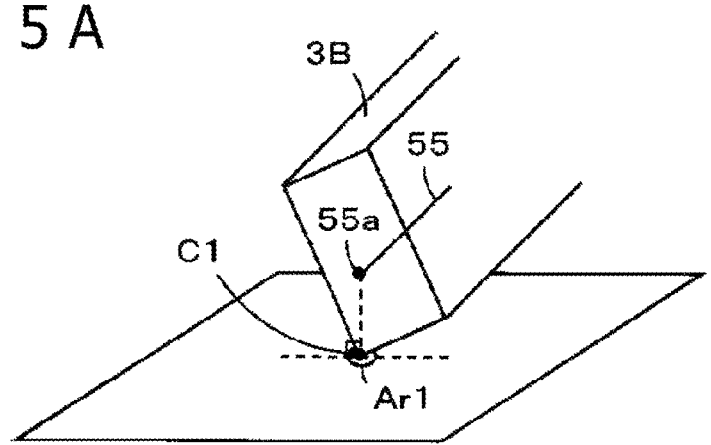
FIGS. 5A to 5C are diagrams for describing modes of use of the electronic erasing device according to another example of the second embodiment.
Figure 5B:
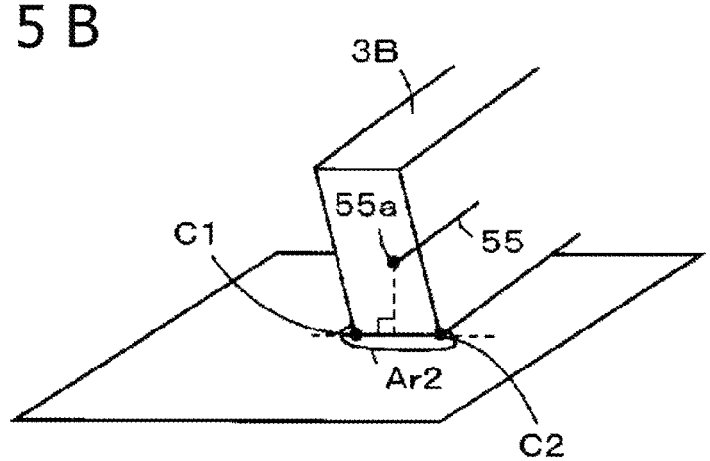
Figure 5C:
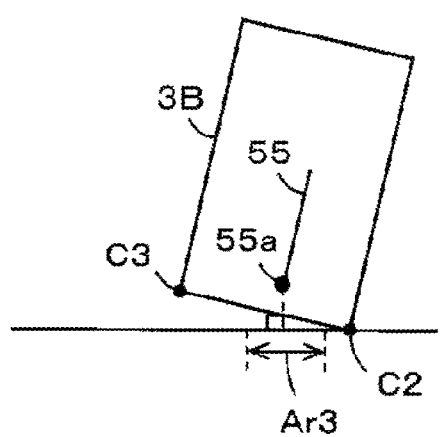

FIGS. 5A to 5C are diagrams for describing modes of use of the electronic erasing device 1B according to the present modification. As illustrated in FIG. 5A, assume that the corner portion C1 of the erasing portion 3B is brought into contact with the operation surface S of the electronic device with the electronic erasing device 1B tilted at a predetermined angle, for example, 45 degrees, to the operation surface S. In this case, the position of intersection between the operation surface S and the perpendicular line extending from the tip portion 55a of the core body 55 of the position indicator 5, which is mounted in the electronic erasing device 1B, to the operation surface S matches the corner portion C1 contacting the operation surface S. Therefore, since the position of the position indicator 5 in the electronic erasing device 1B is fixed, the position of contact between the operation surface S and the corner portion of the erasing portion 3B can be identified based on the perpendicular line extending from the tip portion 55a of the core body 55 of the position indicator 5 to the operation surface S. Based on this identified position of contact, an erasable area Ar1 can be set and an erasure target image can be erased.

The angle at which the electronic erasing device 1B is tilted does not have to be exactly 45 degrees. For example, even with 35 to 55 degrees, changing the position of the position indicator 5 in the electronic erasing device 1B can make the corner portion match the erasure range. However, it goes without saying that an angle of the corner portion that is easy to use is 45 degrees.

As illustrated in FIG. 5B, assume that the linear corner portion connecting the corner portions C1 and C2 is brought into contact with the operation surface S of the electronic device with the electronic erasing device 1B tilted at a predetermined angle, for example, 45 degrees, to the operation surface S. In this case, the perpendicular line extending from the tip portion 55a of the core body 55 of the position indicator 5, which is mounted in the electronic erasing device 1B according to this example, to the operation surface S matches the linear corner portion contacting the operation surface S. Therefore, since the position of the position indicator 5 in the electronic erasing device 1B is fixed, the position of contact between the operation surface S and the linear corner portion connecting the corner portions C1 and C2 of the erasing portion 3B can be identified based on the perpendicular line extending from the tip portion 55a of the core body 55 of the position indicator 5 to the operation surface S. Based on this identified position of contact, an erasable area Ar2 can be set and an erasure target image can be erased.

As illustrated in FIG. 5C, assume that the linear corner portion connecting the corner portions C1 and C2 of the erasing portion 3B is brought into contact with the operation surface S, but the angle at which the electronic erasing device 1B is tilted to the operation surface S is decreased. For example, consider a case where the angle between the operation surface S and a side surface of the electronic erasing device 1B is greater than 55 degrees and less than 90 degrees. In this case, the position of intersection between the operation surface S and the perpendicular line extending from the tip portion 55a of the core body 55 of the position indicator 5, which is mounted in the electronic erasing device 1B, to the operation surface S deviates significantly from the actual position of contact between the operation surface S and the erasing portion 3B.

Therefore, when the tilt of the electronic erasing device 1B is small, an erasable area is not set based on the actual position of contact between the operation surface S and the erasing portion 3B, but based on the position in front of the actual position of contact, that is, based on the position of intersection between the operation surface S and the perpendicular line extending from the tip portion 55a of the core body 55 of the position indicator 5 to the operation surface S. In this manner, an erasable area Ar3 is set.

On the contrary, assume that the angle at which the electronic erasing device 1B is tilted is increased. For example, consider a case where the angle between the operation surface S and the side surface of the electronic erasing device 1B is greater than 0 degrees and less than 35 degrees. In this case as well, the position of intersection between the operation surface S and the perpendicular line extending from the tip portion 55a of the core body 55 of the position indicator 5, which is mounted in the electronic erasing device 1B, to the operation surface S deviates significantly from the actual position of contact between the operation surface S and the erasing portion 3B.

Therefore, when the tilt of the electronic erasing device 1B is large, an erasable area is not set based on the actual position of contact between the operation surface S and the erasing portion 3B, but based on the position behind the actual position of contact, that is, based on the position of intersection between the operation surface S and the perpendicular line extending from the tip portion 55a of the core body 55 of the position indicator 5 to the operation surface S. In this manner, the erasable area Ar3 is set. In these cases, although the mode of use of the electronic erasing device 1B is different from the mode of use of a stationery eraser, the user can perform erasing while visually checking the erasure target image.

In order to change the erasable area according to the mode of use of the electronic erasing device 1B, the position detection device of the electronic device needs to be able to detect not only the position indicated by the electronic erasing device 1B, but also the tilt and rotation of the electronic erasing device 1B. The position indicator 5, which is mounted in the electronic erasing device according to each of the above-described embodiments, is of the electromagnetic induction type, as described above. Therefore, the tilt of the electronic erasing device 1B can be detected according to the reception area of the position detection device where the magnetic field emitted as the position indication signal from the coil 51 of the position indicator 5 is received. Simply put, the waveform of the signal (magnetic field) received by the position detection device differs depending on the tilt of the coil 51 of the position indicator 5. Thus, the tilt of the electronic erasing device 1B can be calculated by comparing the magnitudes of the waveforms.

To allow the position detection device to detect the rotation of the electronic erasing device 1B, it is necessary to devise how the ferrite core and the coil of the position indicator 5 are mounted in the electronic erasing device 1B. Specifically, a portion in which the coil 51 is wound around a side surface of the cylindrical ferrite core 52 is configured as follows. First, a cylindrical ferrite core is divided into two portions in the longitudinal direction to form half-pipe shaped first and second ferrite cores. Then, their cut surfaces are put together so as to face each other. In this manner, a cylindrical core member having a cylindrical hole is prepared.

A second coil is wound around the second ferrite core, and the cut surface of the first ferrite core is disposed so as to face the cut surface of the second ferrite core to form a cylindrical shape. A first coil is then wound around the core member in which the first ferrite core and the second ferrite core with the second coil wound therearound are put together. The core member formed in this manner replaces the portion including the ferrite core 52 and the coil 51 of the position indicator 5 illustrated in FIG. 1C. Then, alternately applying current to the first coil and the second coil enables the position detection device to detect the coordinate displacement. On the basis of this displacement, the rotation angle can be calculated. The configuration of detecting the rotation of the position indicator of the electromagnetic induction type is disclosed in detail in Japanese Patent Laid-Open No. 2010-191588.

As further examples of an erasure area corresponding to the rotation angle detected as above, when the linear corner portion connecting the corner portions C1 and C2 illustrated in FIG. 5B is brought into contact with the operation surface S, the long and narrow erasable area Ar2 is displayed. When the electronic erasing device 1B is gradually rotated so as to bring the corner portion C1 into contact with the operation surface S, the narrow erasable area Ar1 is displayed as illustrated in FIG. 5A. When the electronic erasing device 1B is further rotated so as to bring a linear corner portion connecting the corner portions C1 and C4 into contact with the operation surface S, a long and narrow erasure area, not illustrated, including the corner portions C1 and C4 is displayed and this erasure area becomes the area to be erased.

In this manner, in the case of the electronic erasing device 1B according to the modification of the second embodiment described with reference to FIGS. 3A to 5C, the electronic device identifies the mode of use of the electronic erasing device 1B. Then, the electronic device forms the erasure target area corresponding to the mode of use of the electronic erasing device 1B, so that the input image information (erasure target image) can be erased. Specifically, the electronic device identifies the apex contact state (point contact state) illustrated in FIG. 5A, the short-side contact state (side contact state) illustrated in FIG. 5B, and the bottom-surface indication state illustrated in FIG. 5C. The electronic device specifies the erasable area according to the corresponding state, enabling the erasure of the input image information.

Configuration of Writing Information Processing System

Figure 6:
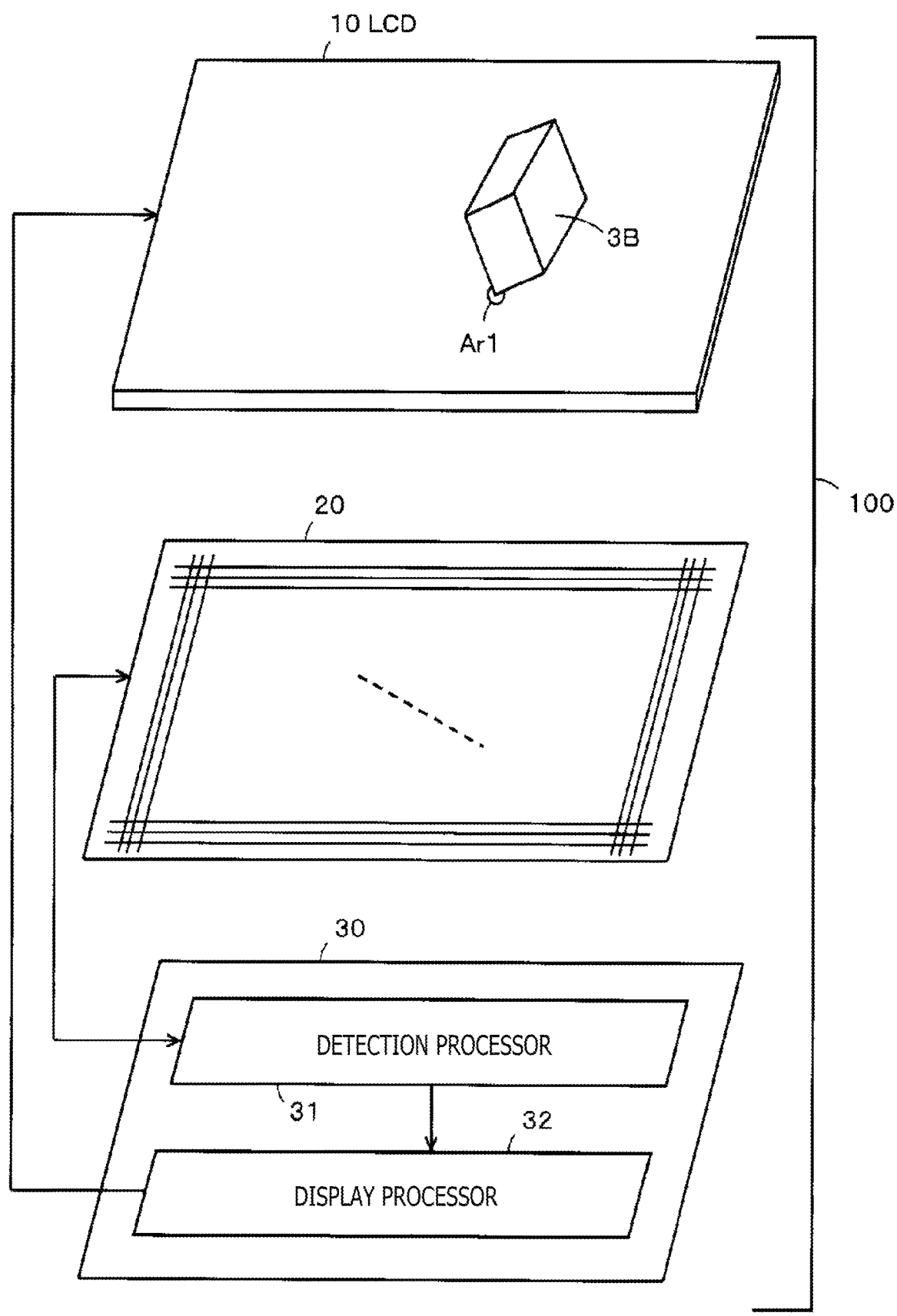
FIG. 6 is a diagram for describing a writing information processing system including the electronic erasing device and an electronic device.

FIG. 6 is a diagram for describing a writing information processing system including the electronic erasing device 1B and an electronic device 100. As described above, the electronic erasing devices 1, 1A, and 1B work with the electronic device to erase the input image information input into the electronic device using the electronic pen and displayed thereon. Hereinafter, the schematic configuration of the electronic device 100 and an example of a mode of use of the writing information processing system including the electronic erasing device 1B and the electronic device 100 will be described.

As illustrated in FIG. 6, the electronic device 100 includes an LCD 10, a position detection sensor 20, and a control processor 30. The LCD 10, the position detection sensor 20, and the control processor 30 are stacked and stored in a casing of the electronic device 100. The LCD 10 is a thin display device. The position detection sensor 20 includes a plurality of loop coils disposed in the X-axis and Y-axis directions. The LCD 10 includes a backlight and the like, with its upper surface provided with a protective glass. The control processor 30 is configured as an electronic circuit on a generally-called motherboard. The casing in which these units are stored is omitted.

The position detection sensor 20 and a detection processor 31 of the control processor 30 constitute the position detection device. The LCD 10 and a display processor 32 constitute the display device. The detection processor 31 controls the switching of the loop coil to be used and the switching of the transmission and reception periods. In the reception period, the detection processor 31 detects the indicated position, tilt, and rotation of the electronic erasing device 1B, and the pressing force applied to the erasing portion 3B of the electronic erasing device 1B on the basis of the magnetic field (position indication signal) received from the position indicator through the position detection sensor 20. Then, the detection processor 31 notifies the detection result to the display processor 32.

The display processor 32 identifies the posture of the electronic erasing device 1B on the basis of the indicated position, tilt, rotation, and pressing force received from the detection processor 31, and displays the erasable range as indicated by the erasable area Ar1 in FIG. 6. Specifically, the display processor 32 performs a process of displaying the erasable range surrounded by a line or displaying the erasable range highlighted. Then, the display processor 32 performs an erasing process of erasing the input image information displayed in the erasable area in response to a change in the position indicated by the electronic erasing device 1B. The erasing process erases not only the input image information displayed in the erasable area on the display screen of the LCD 10 but also stored image data, which corresponds to the input image information. With this configuration, the user of the electronic erasing device 1B can erase the desired input image information in accordance with the intent of the user.

Transmission of Pressing Force Through Different Route

Figure 7:
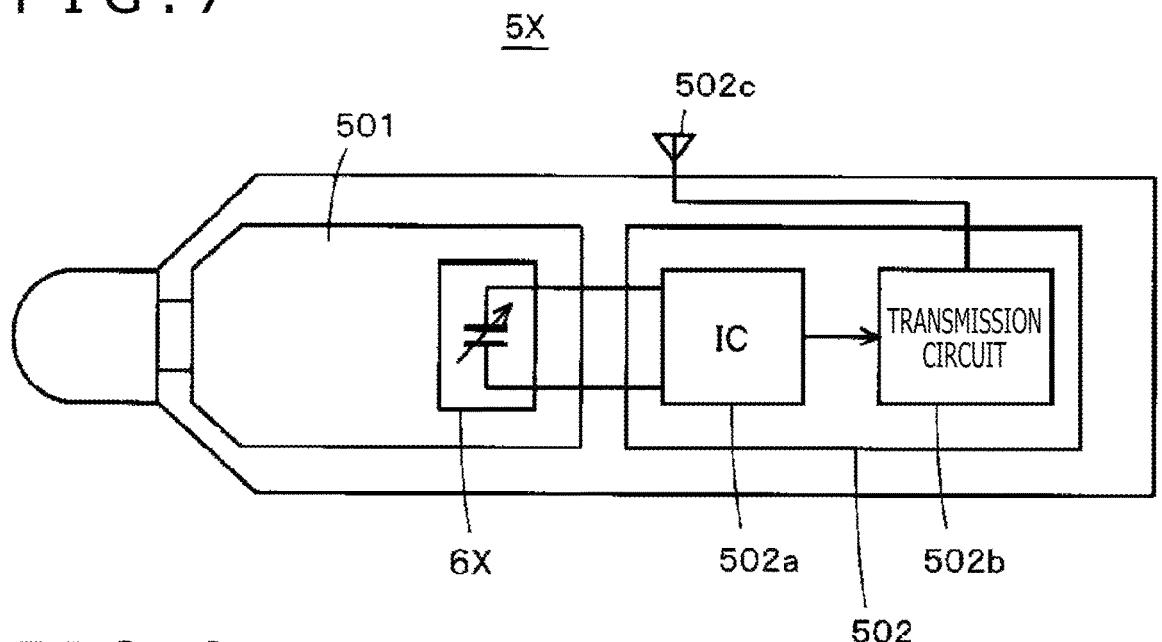
FIG. 7 is a diagram for describing another example of a position indicator used in the electronic erasing device.
Figure 8:
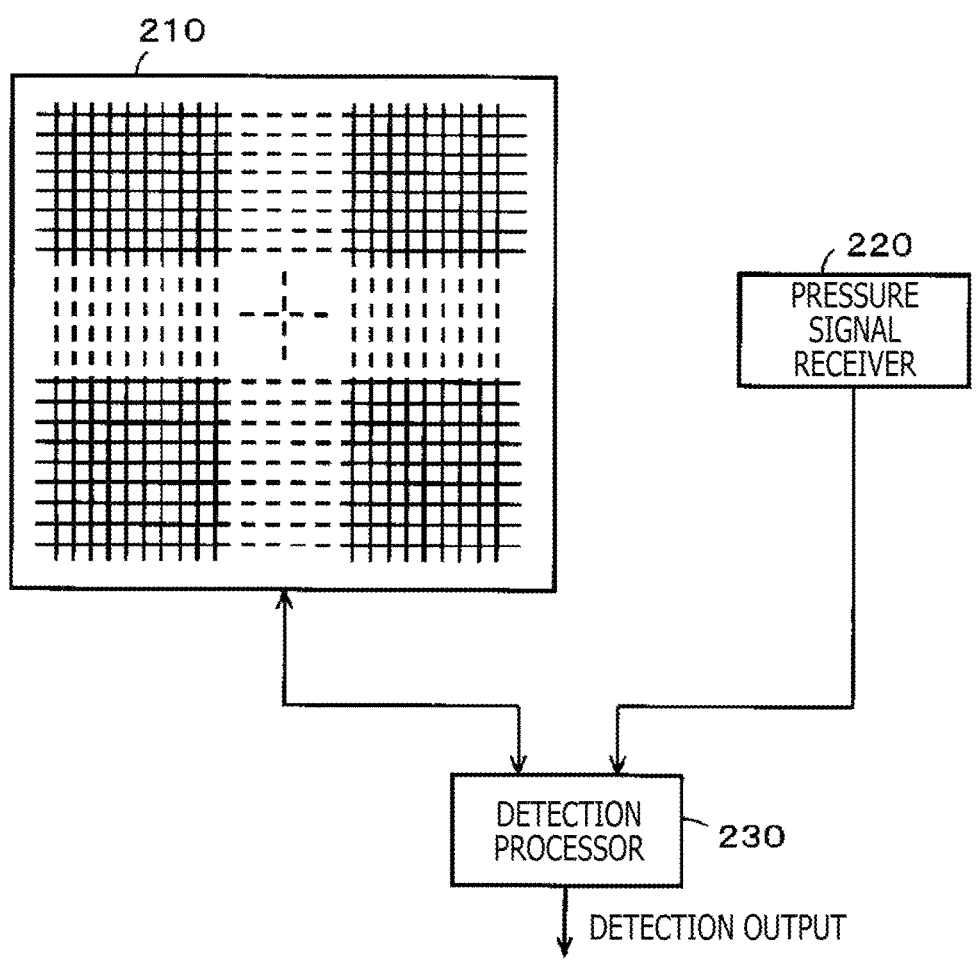
FIG. 8 is a diagram for describing an electronic device with which the electronic erasing device including the position indicator illustrated in FIG. 7 is used.

In the above-described embodiments, for example, information indicating the pressing force applied to the erasing portion 3(3A, 3B) is included in the position indication signal when transmitted from the position indicator 5. However, the way the pressing force is transmitted is not limited thereto. Since at least the pressing force applied to the erasing portion 3(3A, 3B) can be detected by the position indicator 5, the pressing force can be transmitted to the position detection device separately from the position indication signal. FIG. 7 is a diagram for describing another example of the position indicator used in the electronic erasing device. FIG. 8 is a diagram for describing an electronic device with which the electronic erasing device including the position indicator illustrated in FIG. 7 is used.

As illustrated in FIG. 7, a position indicator 5X according to another example includes a pressure detection mechanism 501 and a pressure signal transmitter 502. The pressure detection mechanism 501 includes a pressure detector 6X. The pressure detection mechanism 501 corresponds to a portion including the ferrite core 52, the coil 51, the metal core rod 54, and the core body 55 as with the position indicator 5 described with reference to FIG. 1C. The pressure detection mechanism 501 may include, instead of the ferrite core 52 and the coil 51, the first and second ferrite cores, the first and second coils, and a switch that controls the conduction through the coil wound around the second ferrite core, as described above. The position indicator 5X according to this example has the latter configuration so as to also enable the detection of the rotation.

The pressure detector 6X then supplies the detection output to a signal convertor 502a (denoted as "IC" in FIG. 7) of the pressure signal transmitter 502. Since the detection output from the pressure detector 6X is an analog signal, the signal convertor 502a converts the analog signal into a digital signal and supplies the digital signal to a transmission circuit 502b. The transmission circuit 502b forms a transmission signal conforming to a format for transmitting the digital signal indicating the pressing force received from the signal convertor 502a, and transmits this transmission signal to the position detection device through a transmission antenna 502c.

An electronic device 200 corresponding to the position indicator 5X according to this example is, for example, a tablet PC. As illustrated in FIG. 8, the electronic device 200 includes a position detection sensor 210 of the electromagnetic induction type, a pressure signal receiver 220, and a detection processor 230. The position detection sensor 210, the pressure signal receiver 220, and the detection processor 230 constitute the position detection device. Thus, although not illustrated in FIG. 8, a thin display device such as an LCD is stacked and disposed on the upper side of the position detection sensor 210.

In the transmission period, the position detection sensor 210 supplies current to a selected loop coil and generates and transmits a magnetic field according to the control of the detection processor 230. In the reception period, the position detection sensor 210 receives the position indication signal from the position indicator 5X through the loop coil and supplies the position indication signal to the detection processor 230. The pressure signal receiver 220 receives a pressure signal transmitted through the transmission circuit 502b of the position indicator 5X, converts the pressure signal into a signal in a format that can be processed in the electronic device 200, and supplies the signal to the detection processor 230.

The detection processor 230 controls the switching of the loop coil and the switching of the transmission period and the reception period. In the reception period, the detection processor 230 detects the indicated position, tilt, and rotation on the basis of the position indication signal received from the position indicator 5X through the position detection sensor 210 and the received loop coil position. Moreover, the detection processor 230 detects the pressing force applied to the erasing portion on the basis of the signal received from the pressure signal receiver 220. The detection processor 230 then supplies the detected indicated position, tilt, rotation, and pressing force to a display control circuit, not illustrated in FIG. 8.

The display processor identifies the posture of the electronic erasing device in which the position indicator 5X is mounted on the basis of the indicated position, tilt, rotation, and pressing force received from the detection processor 230. Then, the display processor can control the display of the erasure area to indicate the erasable range as indicated by, for example, the erasable areas Ar1, Ar2, and Ar3 in FIGS. 5A to 5C. Further, the display processor performs an erasing process of erasing input image information displayed in the erasable area in response to a change in the position indicated by the electronic erasing device in which the position indicator 5X is mounted.

Although, in this example, only the information indicating the pressing force detected by the pressure detector 6X is transmitted through the transmission circuit 502b and the transmission antenna 502c, information transmitted therethrough is not limited thereto. For example, information identifying the transmitter as the electronic erasing device may also be transmitted through the transmission circuit 502b and the transmission antenna 502c. Accordingly, even if the position indication signal received by the position detection sensor 210 is a signal of the same frequency as a signal transmitted from the electronic pen for information input, the detection processor 230 can detect that the position indication signal indicates erasure, and notify the display processor thereof.

Disposal of Position Indicator in Casing

Figure 9A:
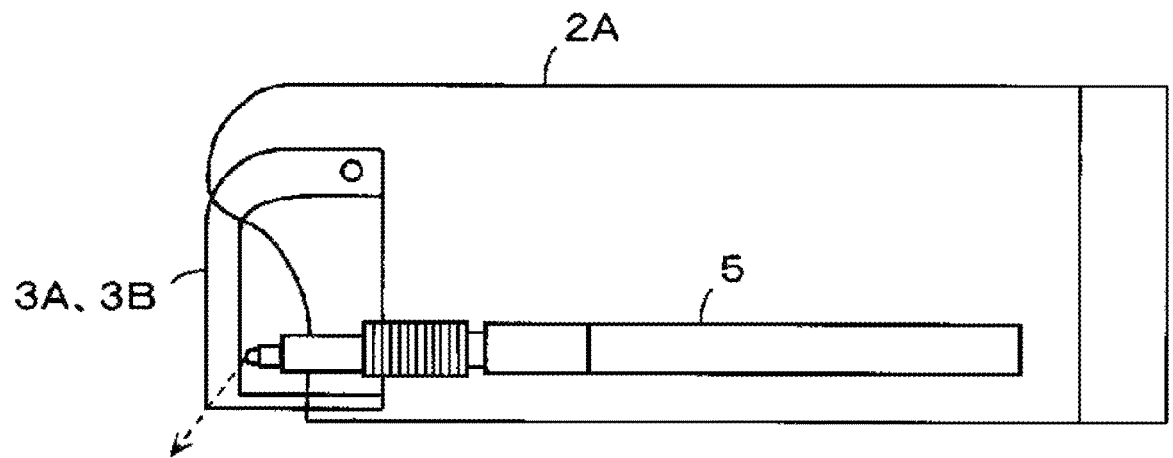
FIGS. 9A and 9B are diagrams for describing how the position indicator is disposed in a casing of the electronic erasing device.
Figure 9B:
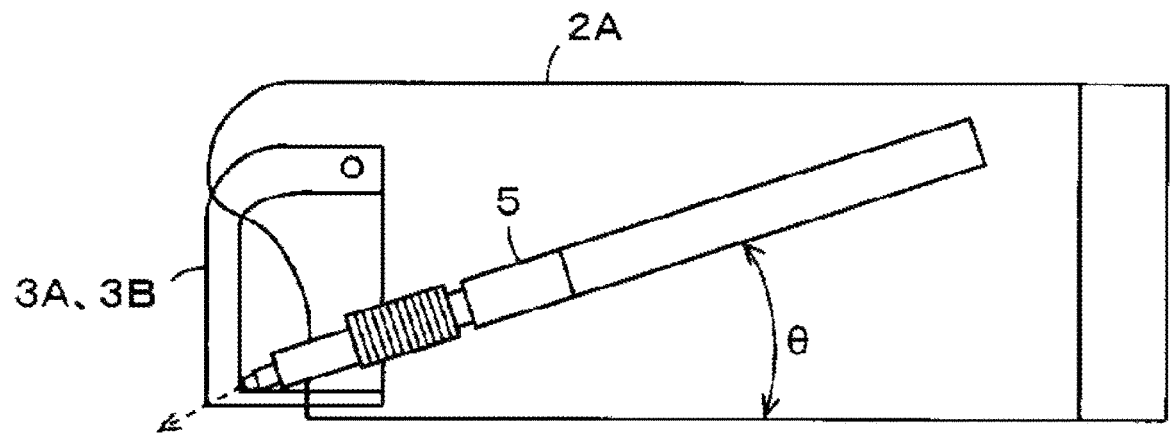

FIGS. 9A and 9B are diagrams for describing how the position indicator is disposed in the casing of the electronic erasing device. As illustrated in FIG. 2B and also in FIG. 9A, in the case of the electronic erasing device of the rectangular type having a rectangular parallelepiped shape, the position indicator 5 is disposed parallel to the side surface of the casing 2A. However, the disposal of the position indicator 5 is not limited thereto. For example, as illustrated in FIG. 9B, the position indicator 5 may be obliquely disposed to the side surface by a predetermined angle θ in the casing 2A.

This configuration can decrease the distance between the tip portion 55a of the core body 55 of the position indicator 5 and a corner portion of the erasing portion 3A (3B) of the electronic erasing device that should be in contact with the operation surface. Moreover, with this configuration, most of the magnetic field emitted through the position at which the core body 55 is disposed can hit the operation surface in a focused manner. Therefore, this configuration can not only narrow the reception position of the magnetic field but also increase the reception level at the position detection device.

Figure 10A:
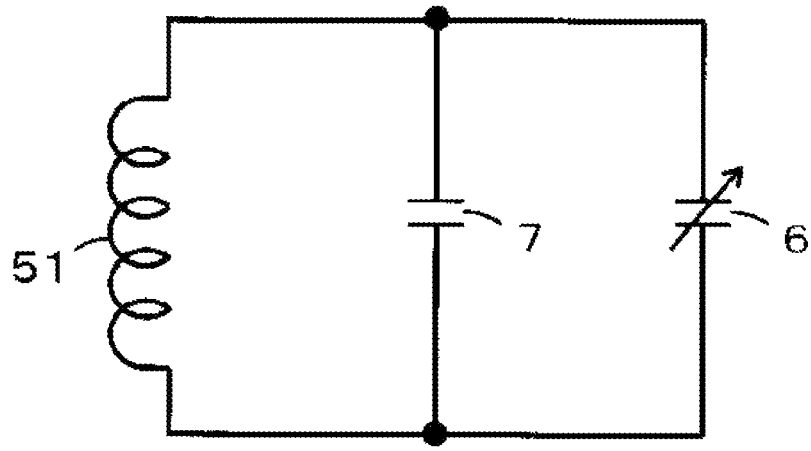
FIGS. 10A and 10B are diagrams respectively illustrating an example of an equivalent circuit of the position indicator of an electromagnetic induction type and an example of an equivalent circuit of a position indicator of an electrostatic coupling type.
Figure 10B:
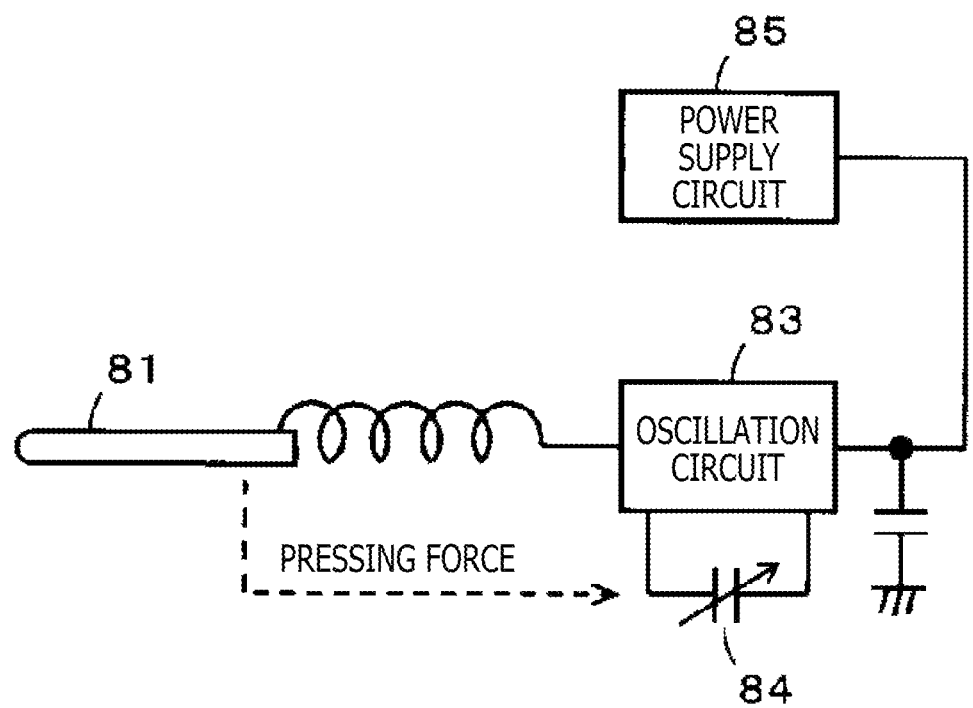

Position Indicator of Electromagnetic Induction Type and Position Indicator of Electrostatic Coupling Type In the above-described embodiments, the position indicator and the position detection device are of the electromagnetic induction type. In another embodiment, the position indicator and the position detection device may be of the electrostatic coupling type. FIGS. 10A and 10B are diagrams respectively illustrating an example of an equivalent circuit of the position indicator of the electromagnetic induction type and an example of an equivalent circuit of the position indicator of the electrostatic coupling type.

As illustrated in FIG. 10A, the position indicator 5 of the electromagnetic induction type employed in the above-described embodiments includes the coil 51, the capacitor 7, and a variable-capacitance capacitor that constitutes the pressure detector 6. Since the position indicator 5 is configured as above, the indicated position, tilt, and pressing force can be transmitted to the position detection device through the position indication signal (magnetic field) emitted from the position indicator 5. Moreover, in order to transmit the rotation of the position indicator 5 as well, as described above, the portion including the ferrite core 52 and the coil 51 is replaced by a configuration including the first and second ferrite cores, the first and second coils, and the switch that controls the conduction through the second coil. With this configuration, the rotation of the electronic erasing device 1B in which the position indicator 5 is mounted can also be transmitted to the position detection device.

As illustrated in FIG. 10B, a position indicator 9 of the electrostatic coupling type includes, for example, a conductive core body 81, a conductive wire 82, an oscillation circuit 83, a variable-capacitance capacitor 84, and a power supply circuit 85. The variable-capacitance capacitor 84 serves as a pressure detector that is pressed by the core body 81. The power supply circuit 85 supplies driving power. With this configuration, the indicated position and the pressing force applied to the core body 81 can be transmitted to the position detection device through a signal output from the core body 81. Configuring the position indicator 9 in this manner can implement the electronic erasing device of the electrostatic coupling type in the same mode as the electronic erasing device of the electromagnetic induction type illustrated in FIGS. 1A to 2D.

In order to transmit the tilt and rotation of the position indicator of the electrostatic coupling type to the position detection device, for example, the core body needs to be non-conductive, and a plurality (two or more) of electrodes need to be disposed on and near the core body. A switching circuit is also disposed to supply an alternating-current (AC) signal to the electrode selected from the plurality of electrodes on the basis of a predetermined selection pattern. Then, when the pattern set by the switching circuit is switched, pattern information indicating the type of set pattern is transmitted to a tablet. By the position detection device analyzing this pattern information, the rotation and tilt of the position indicator can be detected. This technology is disclosed in detail in Japanese Patent Laid-Open No. 2014-35631.

Effects of Embodiments

In accordance with the intent of the user, the electronic erasing devices 1, 1A, and 1B according to the above-described embodiments can erase handwriting information input into the electronic device such as a tablet PC in a similar manner to a stationery eraser. Specifically, the erasable area can be identified based on the corner portion formed by the bottom surface and the side surface of the erasing portion 3(3A) of the electronic erasing device 1(1A) or based on the apex (point), the short side (straight line), or the bottom surface (face) of the erasing portion 3B of the electronic erasing device 1B. Then, an erasure target image can be erased. In this manner, the electronic eraser dedicated to the electronic device can be implemented.

The system including the electronic erasing device 1(1A, 1B) and the electronic device can prevent erasure errors since the system can display the erasable area in a mode recognizable by the user according to the mode of use of the electronic erasing device. Specifically, with this system, the erasable range can be provided in the corner portion of the erasing portion 3(3A, 3B) in a focused manner.

Further, as described above, when the electronic device can detect the rotation of the position indicator, i.e., the absolute rotation angle of the electronic erasing device on the basis of a signal transmitted from the position indicator, the electronic device uses the function of the display processor of the electronic device to set the erasable area according to the side corresponding to the rotation angle. That is, the electronic device can set the erasable area based on the apex of the erasing portion 3B as illustrated in FIG. 5A, or based on the short side of the erasing portion 3B as illustrated in FIG. 5B.

Modification

As described with reference to FIGS. 5A to 5C, the erasable range of the electronic erasing device 1(1A, 1B) is set and displayed in the direction opposite to the side on which the electronic erasing device 1(1A, 1B) is tilted. However, the display of the erasable range is not limited thereto. The erasable range of the electronic erasing device 1(1A, 1B) can be set and displayed in the same direction as the side on which the electronic erasing device 1(1A, 1B) is tilted. Alternatively, the user may select the side on which the erasable range is set and set the selected side in the electronic device.

Moreover, the electronic device can make the erasable area larger or smaller in proportion to the pressure applied to the erasing portion 3(3A, 3B) of the electronic erasing device 1(1A, 1B). The electronic device can also change the erasable area in proportion to the tilt of the electronic erasing device 1(1A, 1B). In this case, if the electronic erasing device 1(1A, 1B) is tilted too much or too little, it becomes difficult to control how much to change the erasable area. Therefore, it is preferable that the electronic erasing device 1(1A, 1B) be tilted in the range of 35 to 55 degrees to the operation surface when use.

Moreover, when the erasing portion 3(3A, 3B) of the electronic erasing device 1(1A, 1B) is moved while being in contact with the operation surface, the erasing operation is performed. In this case, the electronic device may increase the intensity of the erasing to ensure that the erasure target image in the erasable range can be erased.

The bottom surface of the erasing portion may have a circular shape, as with the erasing portion 3, or may have a semicircular shape or a shape including a semicircle, as with the erasing portion 3A, or may have a rectangular shape, as with the erasing portion 3B. The bottom surface of the erasing portion may have a shape of polygon with three or more sides, other than a rectangle. In other words, the bottom surface of the erasing portion can have any of various shapes as long as the bottom surface can form a corner portion together with the side surface.

As long as the electronic erasing device 1(1A, 1B) is tilted in the range of, for example, 35 to 55 degrees to the operation surface S, the position detection device can identify that the position of contact P is the same as the case where the electronic erasing device 1(1A, 1B) is tilted at 45 degrees to the operation surface S. With this configuration, even if the tilt of the electronic erasing device 1(1A, 1B) to the operation surface S changes, the position detection device can set the erasable area based on the position of contact P as long as the tilt of the electronic erasing device 1(1A, 1B) to the operation surface S is within the range of, for example, 35 to 55 degrees. Accordingly, the position detection device can perform the erasing process seamlessly.

It is to be noted that the present disclosure is not limited to the foregoing embodiment, and that various changes can be made without departing from the spirit of the present disclosure.

What is claimed is:

1. An electronic erasing device comprising:
   a casing;
   an erasing portion slidably attached to the casing and having a bottom surface and a side surface that extends from an outer edge of the bottom surface, both the bottom surface and at least a part of the side surface protruding from an end of the casing; and
   a position indicator including a core body and a pressure detector which, in operation, detects a pressure applied to the core body, the position indicator being configured to output a position indication signal indicating an erasure position indicated by the core body and information indicating the pressure detected by the pressure detector,
   wherein the position indicator is included in the erasing portion and fixed inside the casing such that a tip portion of the core body is positioned away from an outer side of the bottom surface of the erasing portion and such that the pressure applied to the erasing portion is transmitted to the core body, and
   wherein an erasable area is formed by an electronic device including a display device and a position detection device when the erasing portion is brought into contact with an operation surface of the electronic device with the casing having a tilt at a predetermined angle to the operation surface.

2. The electronic erasing device according to claim 1,
   wherein the core body of the position indicator is separate from the erasing portion, and
   wherein the position indicator is fixed inside the casing such that the tip portion of the core body is in contact with an inner side of the bottom surface of the erasing portion.

3. The electronic erasing device according to claim 1,
   wherein the operation surface corresponds to a display screen on which an erasure target image is displayed, and
   wherein the position indicator is included in the erasing portion and fixed inside the casing such that, when the erasing portion is brought into contact with the operation surface with the casing having the tilt at the predetermined angle to the operation surface, and if the tilt of the casing causes a position of intersection between the operation surface and a perpendicular line extending from the tip portion of the core body to the operation surface to come closer to a point of contact between the operation surface and a corner portion formed by the bottom surface and the side surface of the erasing portion, the erasable area is formed.

4. The electronic erasing device according to claim 1,
   wherein the bottom surface of the erasing portion has a shape of one of: a circle, a semicircle, or a polygon.

5. The electronic erasing device according to claim 1,
   wherein the position indicator, in operation, includes, in the position indication signal, the information indicating the pressure detected by the pressure detector, information that enables a position detection device to detect tilt of the position indicator, and information that enables the position detection device to detect rotation of the position indicator about an axis center of the position indicator, and transmits the position indication signal.

6. The electronic erasing device according to claim 1, further comprising:
   a wireless transmitter which, in operation, transmits one or both of the information indicating the pressure and information that identifies the electronic erasing device to a position detection.

7. The electronic erasing device according to claim 1,
   wherein the position indicator includes a resonant circuit, and
   wherein the position indicator is of an electromagnetic induction type and indicates the erasure position on an operation surface corresponding to a display screen of a display device of an electronic device including the display device and a position detection device of the electromagnetic induction type by transmitting and receiving a signal to and from the position detection device of the electronic device.

8. The electronic erasing device according to claim 1,
   wherein the core body is formed of a conductive material,
   wherein the position indicator includes an oscillation circuit, and
   wherein the position indicator is of an electrostatic coupling type and indicates the erasure position on an operation surface corresponding to a display screen of a display device of an electronic device including the display device and a position detection device of the electrostatic coupling type by transmitting, through the core body, a signal generated by the oscillation circuit.

9. The electronic erasing device according to claim 1,
wherein a point of contact on the operating surface by the erasing portion is different from a position on the operation surface detected by the position detection device.

10. The electronic erasing device according to claim 9,
wherein a distance between the point of contact on the operating surface by the erasing portion and the position on the operation surface detected by the position detection device varies according to the tilt of the casing.

11. The electronic erasing device according to claim 1,
wherein the tip portion of the core body of the position indicator contacts an inner surface of the bottom surface of the erasing portion.

12. A writing information processing system comprising:
an electronic device including a display device and a position detection device; and
an electronic erasing device including:
  a casing,
  an erasing portion slidably attached to the casing and having a bottom surface and a side surface that extends from an outer edge of the bottom surface, both the bottom surface and at least a part of the side surface protruding from an end of the casing, and
  a position indicator including a core body and a pressure detector which, in operation, detects a pressure applied to the core body, the position indicator being configured to output a position indication signal indicating an erasure position indicated by the core body and information indicating the pressure detected by the pressure detector,
wherein the position indicator is included in the erasing portion and fixed inside the casing such that a tip portion of the core body is positioned away from an outer side of the bottom surface of the erasing portion and such that the pressure applied to the erasing portion is transmitted to the core body,
wherein the electronic device further includes a display processor which, in operation, causes an erasure area to be displayed on the display device based on a detection output received from the position detection device, and
wherein the erasure area is formed when the erasing portion is brought into contact with an operation surface of the electronic device with the casing having a tilt at a predetermined angle to the operation surface.

13. The writing information processing system according to claim 12,
wherein, in response to the casing being rotated with the casing having the tilt at the predetermined angle to the operation surface, the display processor causes the erasure area to change and be displayed according to a rotation position of the casing.

14. The writing information processing system according to claim 12,
wherein a point of contact on the operating surface by the erasing portion is different from a position on the operation surface detected by the position detection device.

15. The writing information processing system according to claim 14,
wherein a distance between the point of contact on the operating surface by the erasing portion and the position on the operation surface detected by the position detection device varies according to the tilt of the casing.

16. The writing information processing system according to claim 12,
wherein the tip portion of the core body of the position indicator contacts an inner surface of the bottom surface of the erasing portion.

* * * * *